United States Patent
Hassan et al.

(10) Patent No.: US 6,462,496 B1
(45) Date of Patent: Oct. 8, 2002

(54) CURRENT MODE APPROACH TO SPINDLE MOTOR CURRENT CONTROL AND ROTOR POSITION SENSE

(75) Inventors: Mehedi Hassan, Plano; Fredrick W. Trafton, Lewisville, both of TX (US); Bert J. White, Irvine; Vincent T. Ng, Alhambra, both of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/447,508

(22) Filed: Nov. 23, 1999

(51) Int. Cl.$^7$ ............................................... G05B 11/01
(52) U.S. Cl. ...................................... 318/560; 318/138
(58) Field of Search ................................. 318/560, 569, 318/254, 138

(56) References Cited

U.S. PATENT DOCUMENTS

| | | | |
|---|---|---|---|
| 5,361,025 A | * 11/1994 | De Filippis et al. | 318/599 |
| 5,412,809 A | 5/1995 | Tam et al. | 395/750 |
| 5,534,758 A | * 7/1996 | Yamamoto et al. | 318/112 |
| 5,821,717 A | 10/1998 | Hassan et al. | 318/560 |
| 5,838,515 A | 11/1998 | Mortazavi et al. | 360/78.12 |
| 5,862,301 A | 1/1999 | Gontowski, Jr. | 388/800 |
| 5,864,116 A | * 1/1999 | Baker | 219/130.33 |
| 5,898,283 A | 4/1999 | Bennett | 318/254 |
| 5,939,909 A | 8/1999 | Callahan, Jr. | 327/108 |
| 5,969,489 A | * 10/1999 | Itou et al. | 318/254 |

* cited by examiner

Primary Examiner—Marlon T. Fletcher
Assistant Examiner—Rina I. Duda
(74) Attorney, Agent, or Firm—W Daniel Swayze, Jr.; W. James Brady; Frederick J. Telecky

(57) ABSTRACT

A control circuit for motor current including a circuit to generate a voltage to indicate the actual motor current, a first convert circuit to convert the voltage indicative of the motor current to a current, a compare circuit to compare the current indicating the motor current with a reference current and generate a difference current between the current indicating the motor current and the reference current, and a second convert circuit to convert the difference current to a voltage to indicate a difference in motor current from the reference current.

10 Claims, 2 Drawing Sheets

CURRENT MODE APPROACH TO SPINDLE MOTOR CURRENT CONTROL AND ROTOR POSITION SENSE

FIELD OF THE INVENTION

The present invention relates generally to the field of disk drive circuits and more particularly to a method and circuit for driving a hard disk drive motor and the associated control.

BACKGROUND OF THE INVENTION

A hard disk drive generally includes a stack of rotating disks or platters, a spindle motor which causes the disks to rotate, read/write heads which fly above the surface of the disks, an actuator motor (known as a "voice coil motor" or VCM) which controls the positioning of the read/write heads, power circuitry to provide electrical power to the spindle and voice coil motors, and control circuitry to control the operation of the spindle and voice coil motors.

A read/write head reads data from a disk by sensing flux changes on the magnetic surface of the disk as it passes beneath the read/write head. To synchronize the data being read from the disk with the operation of the data processing circuitry, it is required to carefully control the speed of rotation of the disks. This is usually accomplished by controlling the current delivered to the spindle motor.

Current control can be effected in two ways. The first is pulse width modulation, in which the driving current is modulated by a square wave. Current is delivered to the spindle motor only when the square wave is high. The duty cycle of the pulse width modulation signal therefore determines the average current delivered to the spindle motor.

The other mode of current control is known as linear current control. In this mode, an analog voltage input signal is provided which is proportional to the current to be delivered to the spindle motor. The spindle motor control circuitry processes the input signal and adjusts the level of current delivered by the power circuitry accordingly.

The three-phase brushless motor is one of the most widely used types of spindle motor which has current energizing respective motor coils using a full wave bridge configuration. The bridge includes two power stages for each phase, so typically there are six power stages, each with a power device. Three of the power stages and their power devices are referred to as "low side" stages and devices because they are connected between the motor coil and a sense resistor which is connected to ground. The other three of the power stages and their power devices are referred to as "high side" stages and devices because they are connected between a power supply and the motor coil.

The power devices are operated as switches in a sequence that allows pulses of current to flow from the power supply through a high side power device, a coil of a first of the three stages, a coil of a second of the three stages, and then through a low side power device to ground. The power device may include a power driver or a FET. This process is repeated in a generally well known manner for the other power devices and coil pairs to achieve three-phase energization from a single, direct current, power supply. The switching, or commutation, characteristics of the power devices are very important in achieving good performance from the motor and other favorable characteristics.

It is necessary to control the current from the motor. One way that has been used is that the motor current passes through a sense resistor to generate a sense voltage. Typically, the sense resistors are small, and the voltage generated by the sense resistors needs to be amplified or gained up. The voltage from the sense resistor is amplified and compared with a reference voltage. When the voltage is above the reference voltage or below the reference voltage, the motor current is either increased or decreased to adjust to a desired level where it matches the reference voltage. However, this method of control of the motor current is unsatisfactory because the voltage gain resulting from the amplification causes offset which is difficult to correct. Furthermore, the voltage comparators are not process independent, and correspondingly, changes in process are not easily compensated for within the amplifier.

SUMMARY OF THE INVENTION

The present invention includes a method and apparatus for spindle motor control that is current-based. The present invention uses current in the control of the motor s current. This provides less error. Furthermore, comparing current is more accurate than comparing voltages, and the circuits described allow a process independent comparison of current, which is proportional and a scaled down version of motor current, to a reference current. The current method is not process independent due to its approach in the voltage domain.

DETAILED DESCRIPTION OF THE PRESENT INVENTION

The present invention is described with reference to figures in which similar or the same numbers represent the same or similar elements. While this invention is described in terms for achieving the invention's objectives, it can be appreciated by those skilled in the art that variations may be accomplished in view of these teachings without deviation from the spirit or scope of the invention.

Figure 1:
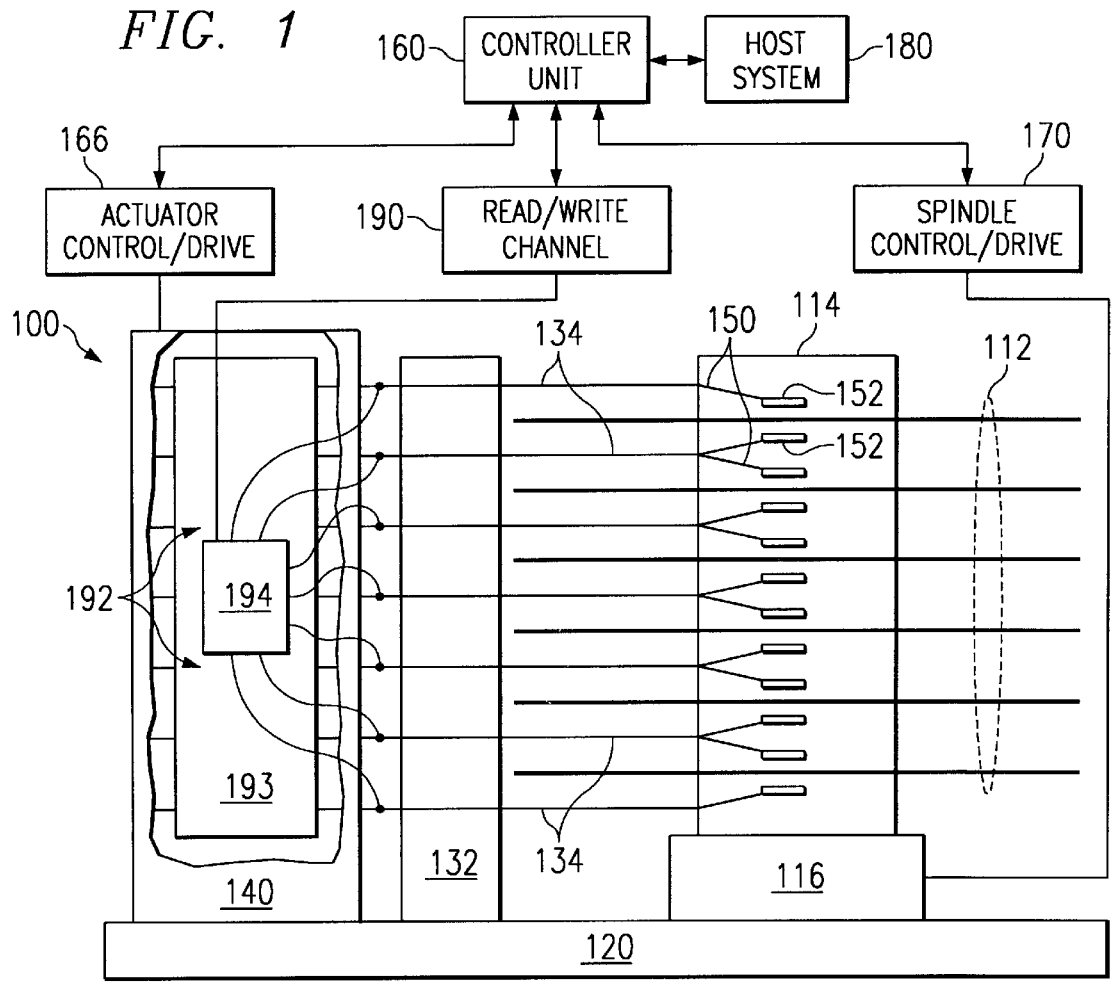
FIG. 1 illustrates a side view of a hard disk drive system.
Figure 2:
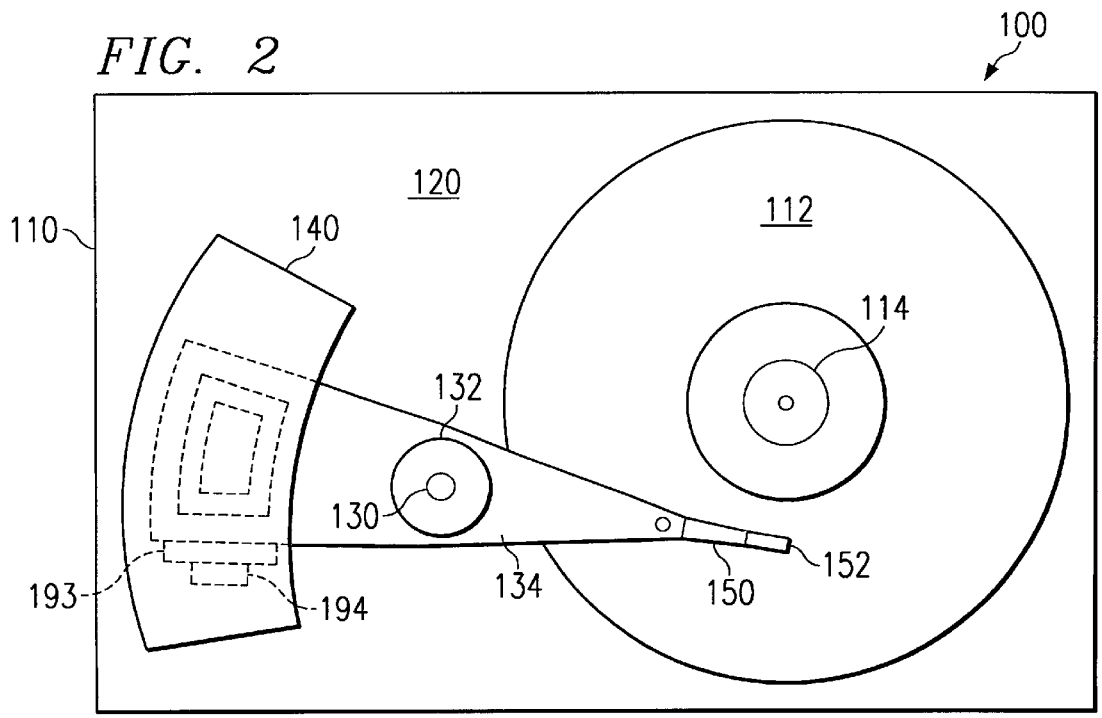
FIG. 2 illustrates a top view of a hard disk drive system.

FIGS. 1 and 2 show a side and top view, respectively, of a disk drive system designated by the general reference number 100 within an enclosure 110. The disk drive system 100 includes a plurality of stacked magnetic recording disks 112 mounted to a spindle 114. The disks 112 may be conventional particulate or thin film recording disk or, in other embodiments, they may be liquid-bearing disks. The spindle 114 is attached to a spindle motor 116 which rotates the spindle 114 and disks 112. A chassis 120 is connected to the enclosure 110, providing stable mechanical support for the disk drive system. The spindle motor 116 and the actuator shaft 130 are attached to the chassis 120. A hub assembly 132 rotates about the actuator shaft 130 and supports a plurality of actuator arms 134. The stack of actuator arms 134 is sometimes referred to as a "comb." A rotary voice coil motor 140 is attached to chassis 120 and to a rear portion of the actuator arms 134.

A plurality of head suspension assemblies 150 are attached to the actuator arms 134. A plurality of inductive transducer heads 152 are attached respectively to the suspension assemblies 150, each head 152 including at least one inductive write element. In addition thereto, each head 152 may also include an inductive read element or a MR (magneto-resistive) read element. The heads 152 are positioned proximate to the disks 112 by the suspension assemblies 150 so that during operation, the heads are in electromagnetic communication with the disks 112. The rotary voice coil motor 140 rotates the actuator arms 134 about the actuator shaft 130 in order to move the head suspension assemblies 150 to the desired radial position on disks 112.

A controller unit 160 provides overall control to the disk drive system 100, including rotation control of the disks 112 and position control of the heads 152 as is a portion of the spindle control/drive unit 170. The control circuit of the present invention involves the speed control of the disks 112. The controller 160 includes (not shown) a central processing unit (CPU), a memory unit, and other digital circuitry, although it should be apparent that these aspects could also be enabled by hardware logic by one skilled in the computer arts. Controller unit 160 is connected to the actuator control/drive unit 166 which is in turn connected to the rotary voice coil motor 140. A host system 180, typically a computer system or personal computer (PC), is connected to the controller unit 160. The host system 180 may send digital data to the controller unit 160 to be stored on the disks, or it may request that digital data at a specified location be read from the disks 112 and sent back to the host system 180. A read/write channel 190 is coupled to receive and condition read and write signals generated by the controller unit 160 and communicate them to an arm electronics (AE) unit shown generally at 192 through a cut-away portion of the voice coil motor 140. The AE unit 192 includes a printed circuit board 193, or a flexible carrier, mounted on the actuator arms 134 or in close proximity thereto, and an AE module 194 mounted on the printed circuit board 193 or carrier that comprises circuitry preferably implemented in an integrated circuit (IC) chip including read drivers, write drivers, and associated control circuitry. The AE module 194 is coupled via connections in the printed circuit board to the read/write channel 190 and also to each read head and each write head in the plurality of heads 152.

Figure 3:
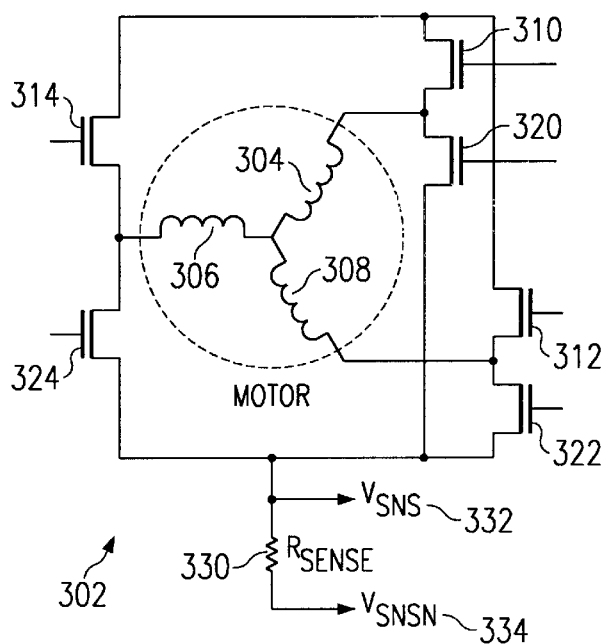
FIG. 3 illustrates drivers for a motor.

A motor circuit is illustrated in FIG. 3. The upper drivers are designated by FET 310, FET 314 and FET 312 for coils 304, 306 and 308, respectively. The low drivers are illustrated by FET 320, FET 324 and FET 322 corresponding to motor coil phases 304, 306 and 308. Each of the low side drivers is connected to sense resistor 320. This sense resistor is in turn connected to ground. The current through sense resistor 330 produces a voltage across sense resistor 330 which is measured across terminals 332 and 334 designated by voltage $V_{SNS}$ and $V_{SNSN}$, respectively. This is an indication of the actual motor current. Connected to terminal 332 is transconductance amplifier 410 to convert the voltage $V_{SNS}$ to a current. The voltage $V_{SNS}$ is input to transconductance amplifier 410. The output of transconductance circuit 410 is connected to NFET 412. The gate of NFET 412 is connected to the output of transconductance circuit 410. The current from transconductance circuit 410 turns on NFET 412. The other input to transconductance circuit 410 is connected to the source of NFET 412. Thus, the difference in voltage between $V_{SNS}$ and $V_{SNSN}$ is impressed on the source of NFET 412 and voltage $V_{SNS}$, determines the amount of current output from the transconductance amplifier 410. Resistor 414 is connected to the source of NFET 412. The current $I_{VMA} \times$ the resistance of resistor 414 generates a voltage at the source of NFET 412. This voltage is equal to $V_{SNS} - V_{SNSN}$. The terminal 334 is connected to resistor 414 and has voltage $V_{SNSN}$ applied. The drain of FET 412 is connected to the loop filter circuit 404 via the switch 423, the input to the inverter 420, and to the output of current DAC 416. The current DAC 416 includes a series of inputs to program the amount of current output from current DAC 416. The amount of current that is output from the current DAC 416 is proportional to the bias current which is additionally input to the current DAC 416. The bias current generator 418 outputs the bias current $I_{BIAS}$ to the current DAC 416. The bias current generator 418 inputs a band gap voltage. Thus, the output current $I_{bias}$ is proportional to the voltage of the band gap.

Figure 5:
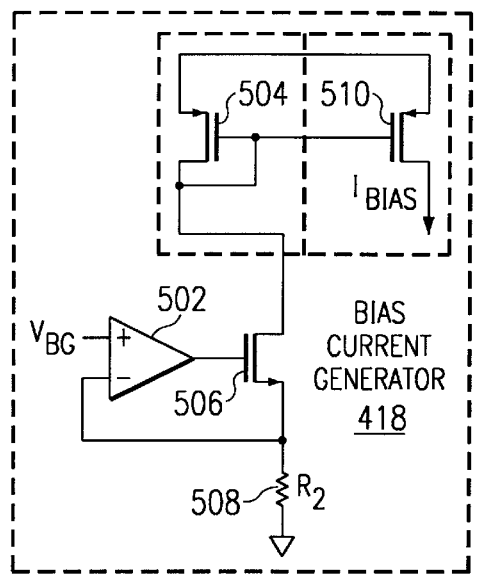
FIG. 5 illustrates a bias current generator.
Figure 4:
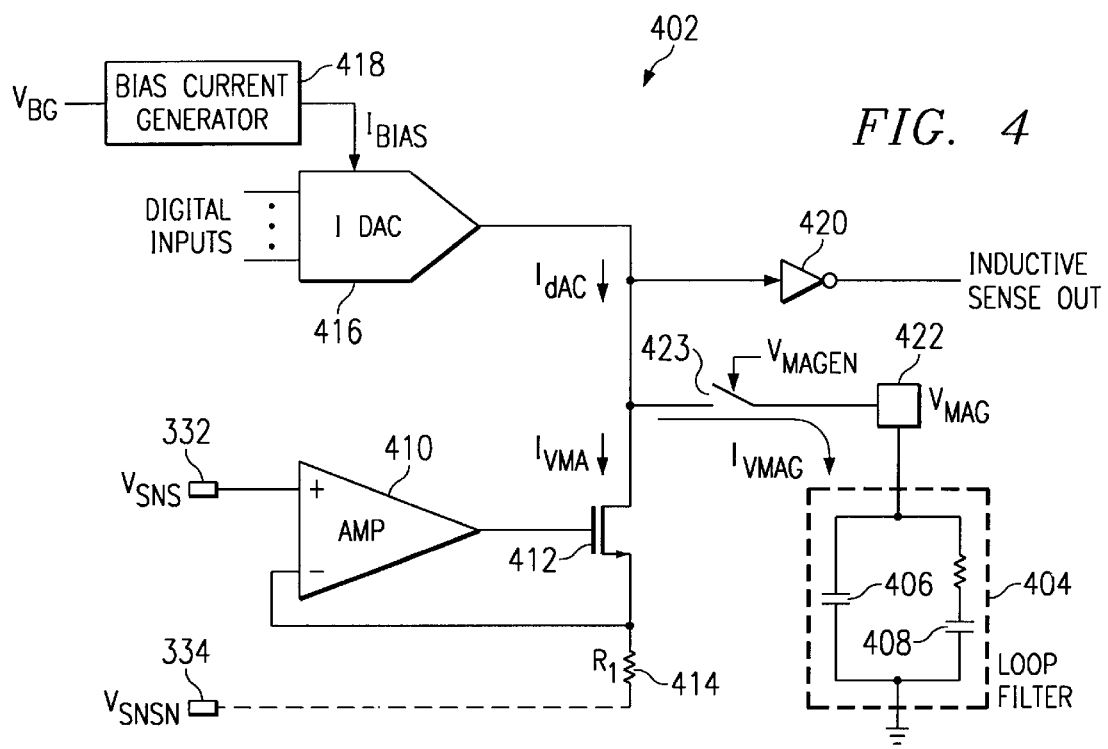
FIG. 4 illustrates a current-based circuit to control motor current.

FIG. 5 illustrates the bias current generator to generate the bias current for the DAC. The current $I_{DAC}$ output from the IDAC is an integer fraction or multiple of the bias current that can be controlled via the input to the DAC and is a reference current. The current $I_{VMA}$ through the drain to source of FET 412 depends on the voltage at terminal 332 and terminal 334, namely the voltage $V_{SNS}$ and voltage $V_{SNSN}$. If there is a difference between the current $I_{DAC}$ output from the current DAC 416 and the current $I_{VMA}$ through the FET 412, the difference $I_{DAC} - I_{VMA}$ or the current $I_{VMAG}$ is input to the loop filter 404. The current $I_{VMAG}$ charges up the capacitors of the loop filter 404 illustrated as capacitors 406 and 408. Thus, the current at terminal 422 is indicative of the current entering the loop filter 440, namely $I_{VMAG}$. The voltage at terminal 422, namely voltage $I_{MAG}$ is input to either a pulse width modulation circuit or a linear circuit. In any event, it can be seen how the voltages are transformed into current $I_{VMAG}$ and input into loop filter 404. The currents $I_{VMA}$ are compared to a reference current, namely $I_{DAC}$, and the resulting difference $I_{VMAG}$ of current is transformed to a voltage. Thus, the voltage $V_{SNS}$ is transformed from the voltage domain to the current domain and then back to the voltage domain. The output voltage $V_{SNS}$ from the sense resistor is converted to the current $I_{VMA}$.

The bias current generator 418 is illustrated in FIG. 5. A band gap voltage $V_{BG}$ is input to transconductance device 502. Additionally, another input of the transconductance device 502 is connected to the source of FET 506. The output of transconductance device 502 is input to the gate of FET 506. A current mirror 504 mirrors the bias current $I_{BIAS}$ to an output leg 510. The current $I_{BIAS}$ is output of the output stage 510. The drain of FET 506 is connected to the current mirror 504. A resistor 508 is also connected to the source of FET 506.

The current through FET 412, namely $I_{VMA}$, is defined by the voltages of Equation 1.

$$I_{VMA} = \frac{V_{SNS} - V_{SNSN}}{R_{414}} \quad (1)$$

The current $I_{dac}$ output from the current DAC 416 is defined in Equation 2.

$$I_{DAC} = I_{BIAS}\left(A_7 + \frac{A_6}{2} + \frac{A_5}{4} + \frac{A_4}{8} + \frac{A_3}{16} + \frac{A_2}{32} + \frac{A_1}{64} + \frac{A_0}{128}\right) \quad (2)$$

$$\sum_{N=0}^{7} A_N = 0 \text{ or } 1$$

$$R_2 = K \cdot R_1 \quad I_{BIAS} = \frac{V_{BG}}{R_2}$$

The current to the loop filter circuit 404 is defined by Equation 3.

$$I_{VMAG} = I_{DAC} - I_{VMA} \quad (3)$$

Substituting from Equation 1 and Equation 2, current $I_{VMAG}$ redefined in Equation 4.

$$I_{VMAG} = \frac{V_{BG}}{R_{508}}\left[\sum_{N=0}^{7} A_N I_{2^{7-N}}\right] - \frac{(V_{SNS} - V_{SNSN})}{R_{414}} \quad (4)$$

$$I_{VMAG} = \frac{1}{R_{414}}\left[\left\{\frac{V_{BG}}{K} * \sum_{N=0}^{7} 2 A_N I_{2^{7-N}}\right\} - (V_{SNS} - V_{SNSN})\right] \quad (5)$$

Looking at Equation 6, we can see that the current $I_{VMAG}$ is proportional to $R_{414}$.

$$I_{VMAG} \propto \frac{1}{R_{414}}\left\{\frac{V_{BG}}{K} - (V_{SNS} - V_{SNSN})\right\} \quad (6)$$

Note that $R_{414}$ and $R_{508}$ are on chip resistors (on the same chip), and if $R_{414}$ and $R_{508}$ vary due to process variation, then the currents $I_{BIAS}$, $I_{DAC}$ and $I_{VMA}$ vary proportionately. The point at which $I_{VMAG}=0$ is not a function of resistor absolute values, only of resistor matching.

The inductive sense output is implemented by opening switch 423 and using the output signal from the inverter 420.

In operation, as the lower driver of the motor closes, the current through the motor flows through lower drivers to the sense resistor 330, creating a voltage across the sense resistor 330, namely voltage $V_{SNS}$ and voltage $V_{SNSN}$. The voltage $V_{SNSN}$ is input to transconductance circuit 410, and this voltage is impressed at the source of NFET 412. The transconductance circuit transforms the input voltage to a current. The current is input to FET 412 to control current $I_{VMA}$. Thus, the current $I_{VMA}$, flowing through FET 412 is proportional to the difference of voltage $V_{SNS}$ minus the voltage $V_{SNSN}$. The IDAC 416 outputs current $I_{DAC}$. This current is set by a digitally input value. It is proportional to the current $I_{BIAS}$, which is input to the IDAC 416. The current $I_{BIAS}$ is proportional to the band gap voltage generated by the bias current generator 418. If there is a difference between $I_{DAC}$ and $1_{VMA}$, this difference flows to loop filter 404, and the magnitude of the difference is current $I_{VMAG}$. The current $I_{VMAG}$ is input to loop filter 404 and generates a voltage resulting from the capacitors 408 and 406. This voltage $V_{MAG}$ is output at terminal 422. This voltage is input to the PWM circuit. Thus, as a result of the above disclosed circuit, the problem associated with gaining up voltages and comparing voltages and the corresponding problems with offset are avoided. A current comparison is made which provides for additional accuracy as well as being process independent.

What is claimed is:

1. A control circuit to control motor current, comprising:
    a circuit to generate a voltage to indicate the actual motor current;
    a first convert circuit to convert said voltage indicative of the motor current to a current;
    a compare circuit to compare said current indicating the motor current with a reference current and generate a difference current between said current indicating the motor current and said reference current; and
    a second convert circuit to convert said difference current to a voltage to indicate a difference in motor current from said reference current.

2. A control circuit for motor current as in claim 1, wherein said compare circuit includes a transconductance circuit.

3. A control circuit for motor current as in claim 1, wherein said second convert circuit includes a capacitor.

4. A control circuit for motor current as in claim 1, wherein said reference current is programmable.

5. A control circuit for motor current as in claim 4, wherein said reference current is generated by a current DAC.

6. A system for reading and writing information to a disk, comprising:
    a disk to store said information;
    a motor to move said disk;
    a circuit to generate a voltage to indicate the actual motor current; and
    a control circuit for motor speed for said motor, generating a motor current command, comprising:
        a circuit to generate a reference current from the motor current command;
        a first convert circuit to convert said voltage indicative of the motor current to a current;
        a compare circuit to compare said current indicating the motor current with a reference current and generate a difference current between said current indicating the motor current and said reference current; and
        a second convert circuit to convert said difference current to a voltage to indicate a difference in motor current from the motor current command.

7. A system for reading and writing information as in claim 6, wherein said compare circuit includes a transconductance circuit.

8. A system for reading and writing information as in claim 6, wherein said second convert circuit includes a capacitor.

9. A system for reading and writing information as in claim 6, wherein said reference current is programmable.

10. A system for reading and writing information as in claim 9, wherein said reference current is generated by a current DAC.

* * * * *